(No Model.)
O. D. WOODRUFF.
MEAT CUTTER.
No. 480,002. Patented Aug. 2, 1892.
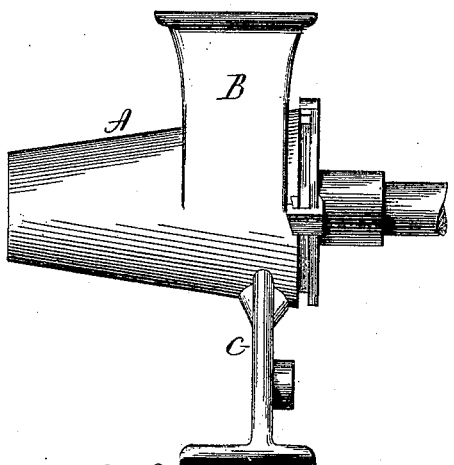
Fig. 1
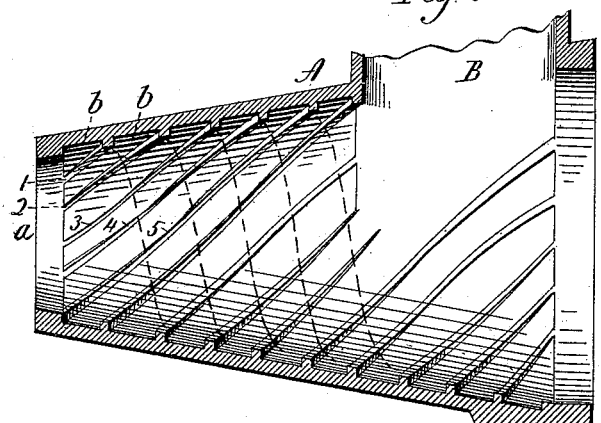
Fig. 5
Fig. 2
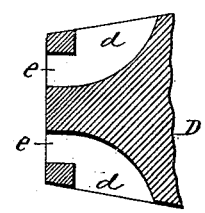
Fig. 4
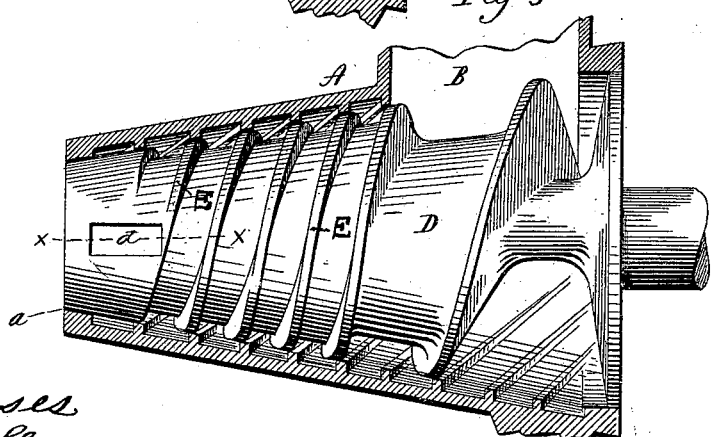
Fig. 3
Witnesses
J. H. Shumway
Lillian D. Kelsey
Oliver D. Woodruff
Inventor
By Earle Seymour
THE NORRIS PETERS CO., PHOTO-LITHO., WASHINGTON, D. C.

UNITED STATES PATENT OFFICE.

OLIVER D. WOODRUFF, OF SOUTHINGTON, CONNECTICUT.

MEAT-CUTTER.

SPECIFICATION forming part of Letters Patent No. 480,002, dated August 2, 1892.

Application filed November 16, 1891. Serial No. 411,995. (No model.)

*To all whom it may concern:*

Be it known that I, OLIVER D. WOODRUFF, of Southington, in the county of Hartford and State of Connecticut, have invented a new Improvement in Meat-Cutters; and I do hereby declare the following, when taken in connection with accompanying drawings and the letters and figures of reference marked thereon, to be a full, clear, and exact description of the same, and which said drawings constitute part of this specification, and represent, in—

Figure 1, a side view of the machine complete; Fig. 2, a longitudinal section through the case, the forcer removed, broken lines indicating the ribs of the forcer as they work against the ribs of the case; Fig. 3, a longitudinal section of the case, showing the forcer in place in side view; Fig. 4, a longitudinal section cutting through the delivery end of the forcer on line $x\ x$ of Fig. 3; Fig. 5, a delivery-end view of the forcer.

This invention relates to an improvement in that class of meat-cutters which consists of a substantially cylindrical case provided with a hopper at one end for the introduction of meat, combined with a spiral forcer arranged longitudinally in the case, adapted to force the meat as it is received from the hopper toward the opposite end of the case, where the meat is operated upon to disintegrate or cut it and discharge it so cut or disintegrated from said other end of the case, and particularly to the machines of this class in which a hollow cylinder is arranged at and within the delivery end of the case, the said cylinder adapted to revolve and its side walls perforated, the said side walls working against corresponding longitudinal cutters in the case and so that as the meat is forced between the said longitudinal cutters and through the perforations in the said hollow cylinder it will be cut off as the perforations of the said cylinder in the revolution of the cylinder pass the said longitudinal cutters. Such a machine is found in United States Patent No. 368,824, dated August 23, 1887, and this invention is an improvement upon the machine of the said patent. In that patent the cutting of the meat is produced entirely by the said perforations in the hollow cylinder and the longitudinal cutters within the case. The space between the said perforated hollow cylinder and the case and within which space the longitudinal cutters are arranged is necessarily very limited, and to force the meat into this space that it may enter the perforations of the cylinder and thereby be cut requires a great amount of power, and in many classes of meat required to be cut more or less clogging necessarily results in the operation of the machine. The object of my invention is to avoid this difficulty and give to the meat a preliminary cutting before it shall reach the said perforated cylinder.

To this end the invention consists in combining with the said perforated cylinder and its longitudinal cutters in the case a preliminary cutting device which will operate to cut the meat to a very considerable extent before the meat will reach the perforations in the said cylinder, and as more fully hereinafter described.

A represents the case of the machine, which is preferably made tapering or of conical shape, it being constructed with a hopper B at the larger end for the introduction of meat, and is formed as a part of a bracket C or other suitable support for the machine when in operation. Upon the inside of the case the surface is constructed with a series of spiral ribs 1 2 3 4, and so on, more or less, these ribs inclining from the hopper toward the opposite or smaller end of the case and terminating near the open end, but so as to leave a plain annular surface $a$ around the inside at that other or delivery end. These ribs produce corresponding recesses $b$ between them and are arranged so near together as to attain the greatest practical number of such spiral ribs within the case, all inclined from the hopper toward the other or delivery end end of the case. Within the case the forcer D is arranged in the usual manner. The forcer is adapted to revolve within the case, also in the usual manner, and it is constructed with a spiral rib E at the hopper end, which under the revolution of the forcer will force the meat from the hopper end toward the opposite or delivery end. The forcing-rib is spiral and inclined in the same direction as the ribs of the case. Beyond the hopper the body of the forcer is somewhat smaller in diameter than the internal diameter of the ribs of the case. Longitudinally this surface of the forcer is substantially parallel with the inner surface of the hopper; but at the outer or delivery end the forcer is made of an external diameter substantially corresponding to the internal diameter of the ribs at that end of the case and of the plain surface *a*, as clearly seen in Fig. 3, and so that this delivery-end portion of the forcer will run substantially in contact with the surface *a* and the corresponding surface of the ribs within the case. Near the outer end of the forcer and through the said plain surface of the forcer one or more openings *d* are formed, (here represented as four,) and these openings *d* turn outward through the end of the forcer, each preferably having an independent delivery or discharge opening *e*, as seen in Figs. 4 and 5. The openings *d* correspond to the openings of the forcer or cutting-cylinder in the said patent before referred to, and they work in conjunction with that portion of the spiral ribs of the case over which they pass as the forcer is revolved. The body of the forcer from the hopper to the said plain surface at the end of the forcer is constructed with spiral ribs inclined in the same direction as the spiral ribs in the case and, like the ribs in the case, should be as near together as they practically may be, and, like the ribs in the case, are substantially parallel with each other. They terminate at the said plain surface of the forcer—that is, circumferentially—in a plane substantially at the inner end of the openings *d*, as seen in Fig. 3.

As the ribs on the forcer incline in the same direction as the ribs on the case, it follows that in revolving, the ribs on the forcer work diagonally across the ribs on the case, as indicated in broken lines, Fig. 2, the said broken lines indicating the ribs on the forcer in the position in which they revolve against the ribs of the case, and the ribs on the forcer thus working in conjunction with the ribs in the case serve as cutters and produce a shearing cut upon the material which may be passing between the revolving forcer and the case.

In operation the meat is introduced through the hopper in the usual manner and the forcer revolved, the spiral rib E forces the meat forward into the spaces between the ribs of the case and the ribs of the forcer, and as it is so forced the spiral ribs on the forcer working against the spiral ribs of the case, as before described, cut or shear the meat as it so passes, producing a continuous cutting of the meat from the time it passes into the case until it reaches the openings *d* of the forcer, so that when it reaches this point it has been practically and thoroughly cut, and the meat so cut continues its advance movement between the ribs of the case into the space between the plain surface of the forcer and the case at the delivery end, and thus forced into this space it is driven into the openings *d* and thence out through the delivery-openings *e*. The openings *d* work in connection with the spiral ribs over which they pass in the revolution of the forcer, so that the meat is still further cut by the edges of the openings working against the corresponding edges of the spiral ribs, which cut is a shearing cut, as is the entire cutting of the machine, and such shearing cut is made with the least possible power. The plain internal annular surface *a* in the case, fitting closely, as it does, upon the plain surface of the forcer, makes a tight joint at that end of the case to prevent the escape of meat otherwise than through the said openings *d*. The delivery-openings *e*, corresponding to the cutting-openings *d*, deliver the meat in several streams, corresponding in number to the number of openings *d*, and thus deliver the mass of meat completely cut and thoroughly separated.

By cutting the meat before it reaches the openings in the forcer, those openings are relieved to a very great extent from the amount of work required when they produce the entire cutting operation, as in the patent before referred to.

While I prefer to make the delivery-openings each independent of the other and corresponding to the cutting-openings in the forcer, the cutting-openings of the forcer may discharge into a recess in the end of the forcer common to all the openings, as seen in broken lines, Fig. 5, and as in the patent before referred to.

I have not described the support and adjustment of the forcer in the case, for the reason that the mechanism shown for this purpose is a common and well-known device, and for which any of the known mechanisms for this purpose may be substituted.

While preferring to make the case and forcer correspondingly tapering, it will be understood that they may be made of equal diameter throughout, as in the patent before referred to, both shapes being common and well known.

The construction of the delivery-openings in the forcer so that each of the cutting-openings through the forcer into the case may have its own independent discharge may be applied in the construction of machine like that in the patent before mentioned—that is to say, in a machine without the preliminary cutting—and thereby permit the discharge of the meat in strings, as it were, instead of a solid mass, as must be the case in the construction as shown in that patent.

I claim—

1. In a machine for cutting meat and similar purposes, the combination of a case provided with a hopper near one end, through which meat may be supplied to the case, the interior of the case constructed with a series of spiral ribs running from the hopper end toward the opposite or delivery end, but terminating near the said delivery end and so as to leave a plain annular surface within the case at the delivery end, combined with a revolving forcer constructed with a spiral rib by which the meat may be forced toward the delivery end, the body of the forcer from the hopper toward the delivery end constructed with a surface substantially parallel with the corresponding surface of the case and with a series of spiral ribs upon its surface from the hopper toward the delivery end inclined in the same direction as the ribs in the case, but the said spiral ribs on the body of the forcer terminating at a distance from the outer or delivery end of the forcer, the said outer or delivery end filling the said annular plain surface at the delivery end of the case, but extending inward therefrom, and corresponding in diameter to the internal diameter of the ribs in that part of the case and constructed with one or more openings upon the said plain surface leading outward through the end of the forcer, the said openings in said plain surface of the forcer being adapted to pass over the ribs in that part of the case, substantially as described.

2. In a machine for cutting meat and similar purposes, the combination of a case adapted to receive the material to be cut, the case constructed upon its inside with spiral ribs inclined toward the delivery end of the case, combined with a revolving forcer within the case adapted to force the meat supplied to the case toward the delivery end of the case, the delivery end of the forcer constructed with its surface plain and corresponding in diameter to the internal diameter of the corresponding portion of the ribs in the face, the said plain surface of the forcer constructed with openings into the interior of the case and so that said openings may work across the ribs in the case as the forcer is revolved, the said openings each turned outward toward and through the delivery end of the forcer, so as to form separate and independent outlets from each of said openings, substantially as described.

In testimony whereof I have signed this specification in the presence of two subscribing witnesses.

OLIVER D. WOODRUFF.

Witnesses:
FRED C. EARLE,
LILLIAN D. KELSEY.